(12) United States Patent
Morovic et al.

(10) Patent No.: US 10,442,135 B2
(45) Date of Patent: Oct. 15, 2019

(54) GENERATING CONFIGURATION DATA FOR THE PRODUCTION OF A THREE-DIMENSIONAL OBJECT

(71) Applicants: Hewlett-Packard Development Company, L.P., Fort Collins, CO (US); Peter Morovic, Sant Cugat del Valles (ES); Jan Morovic, Colchester (GB)

(72) Inventors: Peter Morovic, Sant Cugat del Valles (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 272 days.

(21) Appl. No.: 15/541,541

(22) PCT Filed: Jan. 30, 2015

(86) PCT No.: PCT/EP2015/052008
§ 371 (c)(1),
(2) Date: Jul. 5, 2017

(87) PCT Pub. No.: WO2016/119902
PCT Pub. Date: Aug. 4, 2016

(65) Prior Publication Data
US 2018/0264733 A1    Sep. 20, 2018

(51) Int. Cl.
*B29C 64/386* (2017.01)
*B33Y 50/00* (2015.01)
*G06F 17/50* (2006.01)

(52) U.S. Cl.
CPC ............ *B29C 64/386* (2017.08); *B33Y 50/00* (2014.12); *G06F 17/50* (2013.01);
(Continued)

(58) Field of Classification Search
CPC ........ B29C 64/386; B33Y 50/00; G06F 17/50; G06F 17/5009; G06F 2217/12; Y02P 90/265
See application file for complete search history.

(56) References Cited

U.S. PATENT DOCUMENTS

| 6,483,607 B1 | 11/2002 | Van de Capelle et al. |
| 7,123,380 B2 | 10/2006 | Van de Capelle |

(Continued)

FOREIGN PATENT DOCUMENTS

| GB | 2502295 A | * 5/2012 | ............ G06T 19/20 |
| GB | 2502295 | 11/2013 | |
| JP | 2002292752 | 10/2002 | |

OTHER PUBLICATIONS

International Search Report and Written Opinion dated Nov. 13, 2015 for PCT/EP2015/052008; Applicant Hewlett-Packard Development Company L.P.

(Continued)

*Primary Examiner* — Kenneth M Lo
*Assistant Examiner* — Mohammad A Rahman
(74) *Attorney, Agent, or Firm* — HP Inc. Patent Department

(57) ABSTRACT

Certain examples described herein relate to apparatus arranged to produce a three-dimensional object. These examples enable color and material properties of such an apparatus to be characterized. This is achieved through the generation of configuration data for the apparatus that maps at least one color property to one or more material volume coverage vector values. This allows for appropriate quantities of materials available to the apparatus to be used to produce colors defined in received object data for the three-dimensional object.

13 Claims, 4 Drawing Sheets

(52) U.S. Cl.
CPC ...... *G06F 17/5009* (2013.01); *G06F 2217/12* (2013.01); *Y02P 90/265* (2015.11)

(56) References Cited

U.S. PATENT DOCUMENTS

| | | |
|---|---|---|
| 7,463,384 B2 | 12/2008 | Tsuchiya et al. |
| 8,480,203 B2 | 7/2013 | Van Thillo et al. |
| 8,798,780 B2 | 8/2014 | Menchik et al. |
| 2012/0276233 A1 | 11/2012 | Napadensky |

OTHER PUBLICATIONS

MakeALot, MakerBot Thingiverse two colour calibration cubes, Sep. 30, 2011; http://www.thingiverse.com/thing:12069.
Chen et al., A Multi-Ink Color-Separation Algorithm Maximizing Color Constancy, IS&T/SID Eleventh Color Imaging Conference, pp. 277-281.

\* cited by examiner

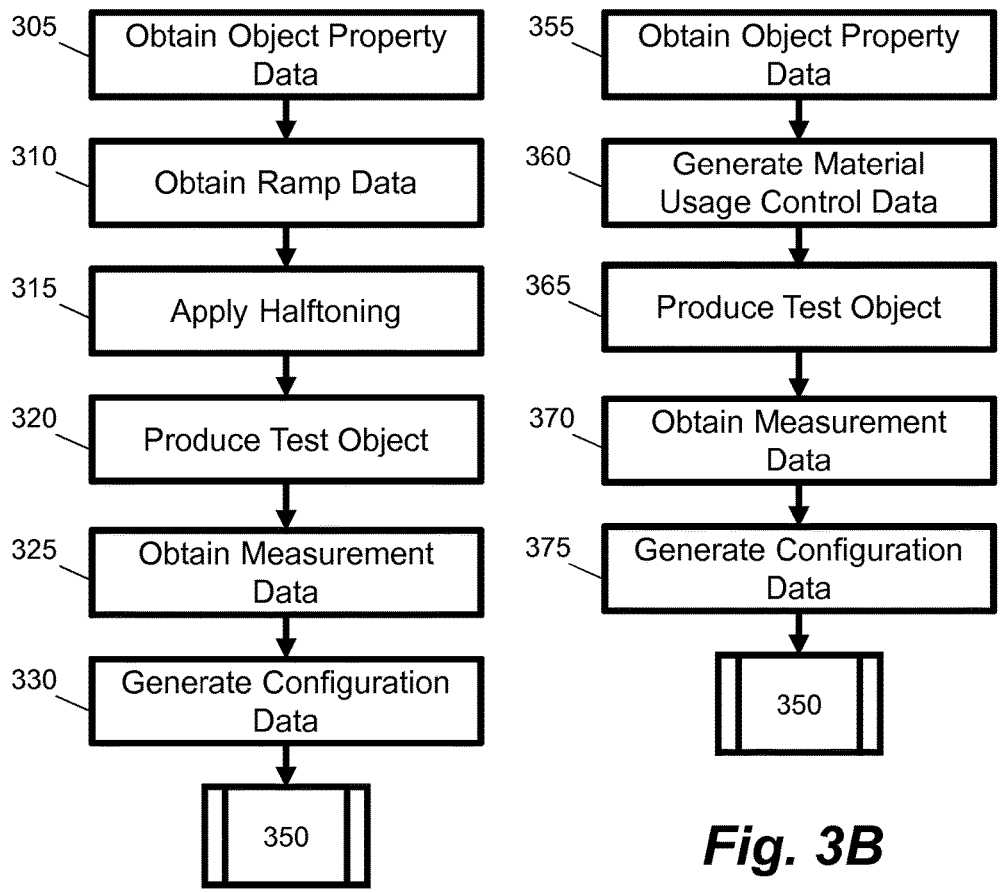
Fig. 3A
Fig. 3B
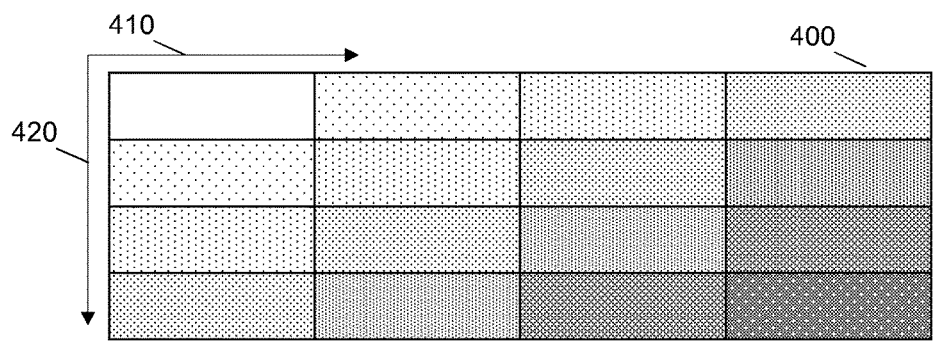
Fig. 4

GENERATING CONFIGURATION DATA FOR THE PRODUCTION OF A THREE-DIMENSIONAL OBJECT

BACKGROUND

Apparatus that generate three-dimensional objects, commonly referred to as "3D printers", have been proposed as a potentially convenient way to produce three-dimensional objects. These apparatus typically receive a definition of the three-dimensional object in the form of an object model. This object model is processed to instruct the apparatus to produce the object using one or more material components. This may be performed on a layer-by-layer basis. There are many different types of such apparatus. The processing of the object model may vary based on the type of apparatus and/or the production technology being implemented.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein:

FIG. 3A is a flow diagram showing a method for generating configuration data based on volume coverage ramp data according to an example;

FIG. 3B is a flow diagram showing a method for generating configuration data based on material component quantities according to an example;

FIG. 4 is a schematic illustration of a three-dimensional test object having variation in at least two-dimensions according to an example;

DETAILED DESCRIPTION

Certain examples described herein relate to apparatus arranged to produce a three-dimensional object. These examples enable color and material properties of such an apparatus to be characterized. This is achieved through the generation of configuration data for the apparatus that maps at least one color property to one or more material volume coverage vector values. In certain cases the configuration data further and/or alternatively maps object properties, e.g. instead of or in addition to the color property. This allows for appropriate quantities of materials available to the apparatus to be used to produce object properties such as colors defined in received object data for the three-dimensional object. The generated configuration data may further be used to characterize the processing pipeline that may be used to move from a definition of the three-dimensional object, e.g. an object model, to a produced version of the object. This is performed in a manner that is agnostic to the materials that are used by the apparatus. For example, no assumptions need be made in relation to the materials and/or the operation of the apparatus as characterization is performed through production of test object portions and the measurement of the properties of these portions. Certain examples described herein also allow for appropriate quantities of materials to be deposited by the apparatus to achieve one or more desired object properties.

By using the approaches taught by certain examples described herein, the need for a-priori information regarding multiple materials available to the apparatus is minimized. Additionally, complex assumptions regarding color and material properties may be avoided and/or reduced, which may avoid discontinuities or other issues in the mapping of object data to control data for the production of objects using the apparatus.

Figure 1:
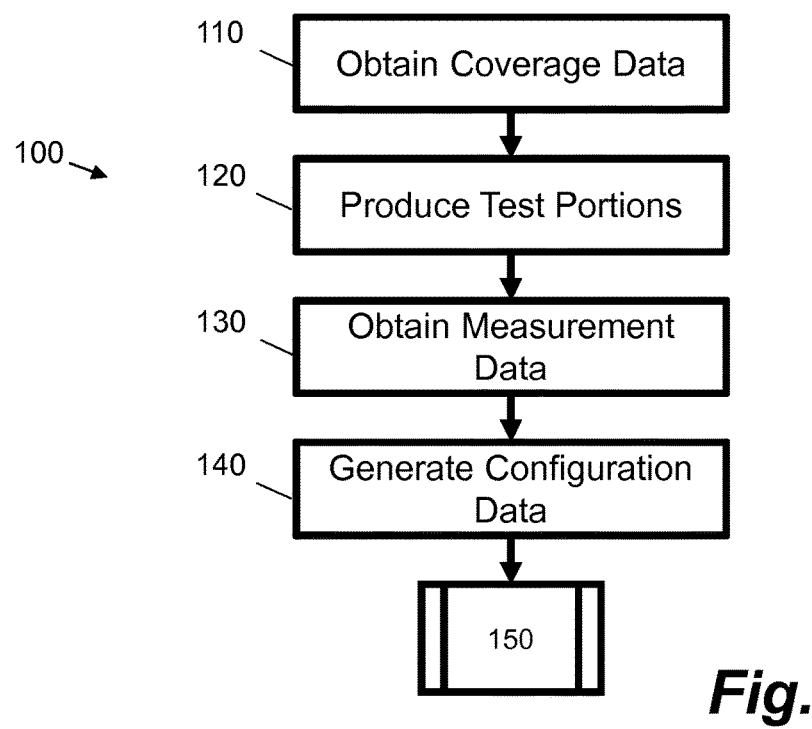
FIG. 1 is a flow diagram showing a method for generating configuration data for a three-dimensional printing apparatus according to an example.

FIG. 1 shows a method for generating configuration data for a three-dimensional printing apparatus according to an example. The apparatus may comprise any apparatus arranged to produce a three-dimensional object. The apparatus is arranged to produce such a three-dimensional object using a set of materials. These "materials" may comprise, amongst others, any combination of different build materials, different agents, different binders, different substrate materials (e.g. materials that are used as a base for build materials), different object property modifiers and different inks.

In one implementation the apparatus may be arranged to use different agents in the form of at least one coalescing agent and at least one coalescing modifier agent. Use of these agents may allow a three-dimensional object to have varying material properties. They may be combined with one or more build materials to generate multi-color objects with varying material properties. For example, there may be multi-color agents that are applied to a single powered build material to generate solidified portions of different colors. These objects may be constructed by depositing at least the coalescing agent and/or the coalescing modifier agent on layers of build material, e.g. layers forming z-plane slices. The coalescing modifier agent may be used to modify solidification of a portion of build material—e.g. to prevent thermal bleed, or to modify a degree of coalescence. In other implementations the apparatus may comprise part of, amongst others, selective laser sintering systems, stereo lithography systems, inkjet systems, fused deposition modelling systems, any three-dimensional printing system, inkjet deposition systems and laminated object manufacturing systems. These include apparatus that directly deposits build materials may be used, rather than those described that use various agents.

Turning to FIG. 1, at block 110, coverage data indicative of a range of material volume coverage vector values for the set of materials available to the apparatus is obtained. In this example, a material volume coverage vector represents proportions for each combination of the set of materials for at least an addressable volume of a three-dimensional object to be produced. These materials may comprise combinations of at least one of agents, inks and powdered build materials. In one case the materials may relate to one of agents, inks and powdered build materials and/or may relate to a subset of these materials. As such, a material volume coverage vector is representative of a probabilistic distribution of available materials that includes combinations of those materials and includes an absence of those materials (a "blank" combination). A material volume coverage vector may have a plurality of values, wherein each value defines a proportion for each combination of one or more materials (a "material primary" or MP) in an addressable volume of a layer of the three-dimensional object. For example, in an apparatus with two available materials—M1 and M2, where each material may be independently deposited in an addressable volume of a layer of the three-dimensional object, there may be $2^2$ (i.e. four) proportions in a given material volume coverage vector: a first proportion for M1 without M2; a second proportion for M2 without M1; a third proportion for an over-deposit of M1 and M2, e.g. M2 deposited over M1 or vice versa; and a fourth proportion for an absence of both M1 and M2. In this case an material volume coverage vector may be: [M1, M2, M1M2, Z] or with example values [0.2, 0.2, 0.5, 0.1]—i.e. in a given [x, y] location in a z-slice, 20% M1 without M2, 20% M2 without M1, 50% M1 and M2 and 10% empty. In this case "empty" may represents an absence of materials in a processed layer, e.g. if agents are deposited on layers of build material this may denote an absence of build material for the processed layer, even though the build material may not be removed until the complete object has been produced. As each value is a proportion and the set of values represent the available material combinations, the set of values in each vector sum to 1 (for ranges of 0-1) or 100% (for percentage ranges).

More generally, for an apparatus having k available materials and L discrete deposit states for said materials, a material volume coverage vector comprises $L^k$ vector components, each vector component representing an available material/deposit state combination, including separate and joined use and an absence of any material. Or in other words, the vector components of a material volume coverage vector represent all materials available to an apparatus and their combinations, they are an enumeration of possible build or deposit states available to the apparatus. These states are the "material primaries" discussed herein. As such the material volume coverage vector has a dimensionality representative of these states and contains the volume coverages (e.g. probabilities) associated with each state. Or in other words, a material volume coverage vector (MVoc) comprises weighted combinations or probabilities of material primaries. The materials may comprise, amongst others, any combination of: different build materials, different substrates, different agents, different binders, different material property modifiers, different build powders, different agents, different epoxies and different inks. In one case, depending on the implementation, the "available materials" may be a selected subset of materials, e.g. may comprise activated or deposit-able materials for a particular production run.

This compares to comparative methods that have k vector components representative of available materials but that do not include combinations, a blank state or different deposit states. As can be seen, the present examples and the comparative methods rapidly diverge when a plurality of materials are available with a plurality of production build states; material volume coverage space is much greater than comparative material representation spaces. Another distinction is that, when compared to comparative methods, any materials available to the apparatus may be included in the material volume coverage vector, e.g. this need not be limited to available colored build materials.

At block 120, the apparatus is used to produce a set of three-dimensional test object portions. These may comprise portions of a common three-dimensional object and/or portions of independent three-dimensional objects. In one case, the number of independent three-dimensional objects may depend on the number of test portions, e.g. each object may be limited to X portions due to space constraints. In any case, each test object portion is produced based on a different material volume coverage vector value from the aforementioned range of material volume coverage vector values. In one case, the range of material volume coverage vector values may comprise at least the range of available material primaries as described above, i.e. a range of available material over-deposit states that include the deposit of one or more materials. In one case, block 120 may comprise halftoning the material volume coverage vector values to generate control data for instructing the deposit of one or more materials, e.g. for generating data to instruct one or more deposit states for one or more materials. This control data may be discrete, e.g. represent the available states deposit at each addressable location, such as each printable voxel. Block 120 may also comprise splitting object data into a number of slices, e.g. z-plane slices; hence, a volume coverage relates to a surface portion of the z-plane slice.

At block 130, measurement data is obtained that is indicative of at least one property for each portion. In one case, a color measurement device, such as a spectrophotometer, may be used to provide a quantitative measurement of the reflection and/or transmission properties of each test portion as a function of wavelength. In another case, a tristimulus colorimeter may be used to provide a measurement in the form of one or more colorimetric values, e.g. based on the International Commission on Illumination (CIE) 1931 XYZ color space, wherein three variables ('X', 'Y' and 'Z' or tristimulus values) are used to model a color, or the CIE 1976 (L*, a*, b*—CIELAB or 'LAB') color space, wherein three variables represent lightness ('L') and opposing color dimensions ('a' and 'b'). This measurement data may be obtained by a color measurement device that is integrated into the apparatus or by an independent color measurement device; e.g. in the latter case the measurement data may be obtained or retrieved from a device other than the apparatus and/or from a computer-readable storage medium. In other cases the measurement data may relate to an object property such as flexibility, stiffness, hardness, conductivity, etc.

In certain cases, the measurement data may be processed to determine values of the color property. For example, if the color property is a colorimetric value such as an XYZ value then output from a spectrophotometer may be processed to convert the measurement data from a spectrum, e.g. an array of reflectance measurements at different sampled wavelengths, to a trimstimulus value. Similarly, if the color property is an RGB value, then additional processing of a colorimetric value may be performed to output an RGB value.

At block 140, the coverage data and the measurement data are processed to generate configuration data 150 for the apparatus. This processing comprises generating a mapping from values of the at least one property to material volume coverage vector values. The mapping is stored as the configuration data. The configuration data may then be used by the apparatus to map received object data to material volume coverage vectors for the production of three-dimensional objects. The configuration data thus represents a characterization of at least the color and/or material properties of the apparatus. The configuration data may be referred to as a color and/or material separation.

Figure 2:
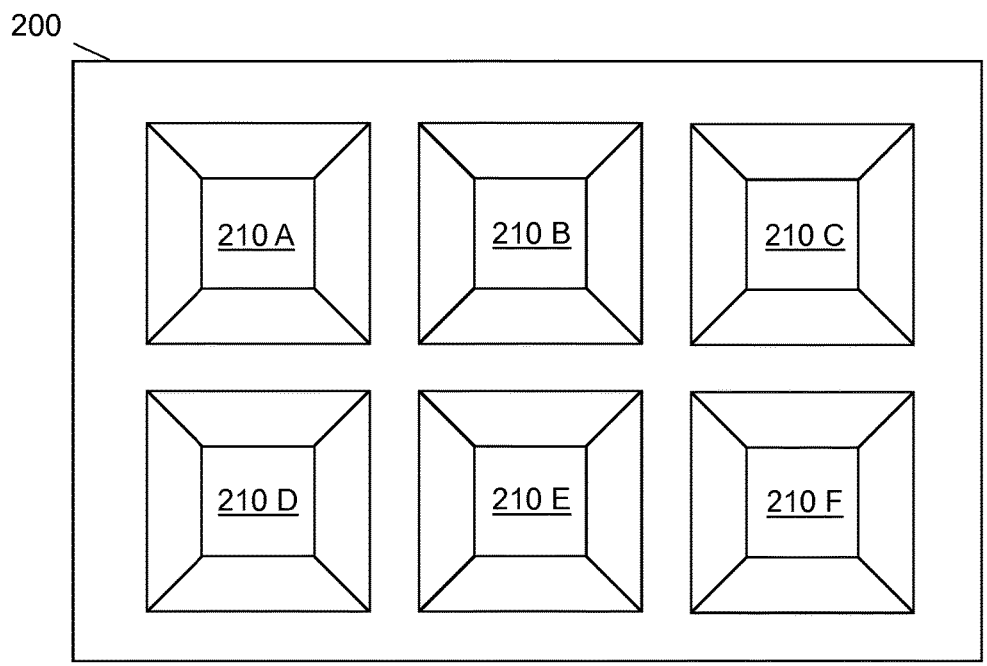
FIG. 2 is a schematic illustration of a three-dimensional test object according to an example.

FIG. 2 shows a three-dimensional test object 200 according to an example. In this example, there are six test object portions 210A to F. In the example of FIG. 2, each three-dimensional test object portion comprises at least one polyhedron that quantizes a hemisphere. In the example of FIG.

2, each polyhedron is a trapezoidal prism, however other three-dimensional shapes may be used including icosahedrons and their multiples (e.g. shapes with 20, 80 and 320 faces depending on a level of quantization that is applied). Each polyhedron has a plurality of faces with predefined angles. In a simple case, two angles may be provided (e.g. 0° and 90°). In another case, four angles may be provided with angles of particular interest for color measurement, e.g. 0°, 30°, 60° and 90°. In a more complex case, a geodesic grid may be used to provide polyhedral test portions that are near-isotropic and may easily be increased or decreased in resolution, for example by changing the number of faces and/or the number of angles.

When using three-dimensional test objects similar to those shown in FIG. 2, block 130 of the method 100 in FIG. 1 may be adapted to obtain measurement data that comprises a plurality of angular measurements. For example, a color property value, such as a spectral or colorimetric value may be measured for each face of each test portion. A predefined angle of each face may then be recorded together with the color property value obtained in relation to the face. In one case, each of the test portions may be measured using either a goniospectrophotometer, arranged to measure one or more of angular spectral reflectance and colorimetry, or with a targeted sampling of a fixed set of angles using a telespectroradiometer under controlled conditions or a spectrophotometer (e.g. using a mechanism to rotate or otherwise move the measurement device). In this example, a hemisphere, or a quantization of a hemisphere, is used as it allows measurement of a plurality of angles of the object and the observer. In certain cases, angle data may be defined in relation to a constant normal vector, e.g. a vector parallel or perpendicular to the z-plane. In certain cases a measurement device may move relative to a produced three-dimensional object in order to capture angle and color data.

In one case, each vector component of a material volume coverage vector may have an associated test object portion. These may be arranged, e.g. on a z-plane of one or more test objects, as one or more charts of test object portions. In one case, each test portion may be produced based on a material volume coverage vector corresponding to an appropriate vector component. In this case, any [x, y, z] location on a given test object portion is configured to have the same material volume coverage vector value. As described above, these vector values may be halftoned in order to generate control data for the production of each test object portion using the apparatus.

In certain cases, to reduce the size of any test object, a test object portion may be split into a plurality of slices (e.g. equivalent to spherical wedges) wherein each slice is associated with a different material component state. For example, a single-pixel-width slice of a quantized hemisphere may represent a limit for the number of slices. In practice, slices equivalent to a half, third, quarter or eighth of a quantized hemisphere (e.g. sectors as viewed from above) may be used to provide robust measurements; the width of a slice generally depending on the accuracy and robustness with which a color measurement can be made. As an example, for an available four-color set of material components (e.g. build materials with colors of cyan, magenta, yellow and black) two quantized hemispheres (e.g. 80 sided polyhedra) may be used as test object portions, wherein each quantized hemisphere is divided into four quadrants or quarter wedges. Each quadrant in this example relates to one of the following material volume coverage vectors: Cyan, Magenta, Yellow, Black, Red (an over-deposit or combination of Magenta and Yellow), Green (an over-deposit or combination of Cyan and Yellow), Blue (an over-deposit or combination of Magenta and Cyan) and composite black (the result of combining Cyan, Magenta and Yellow). The state of "blank" need not be explicitly characterized.

Two additional methods for use in characterizing the apparatus described above are shown in FIGS. 3A and 3B. These methods may be performed prior to the method 100 of FIG. 1 so as to determine suitable volume coverage and material usage/quantity ranges for the apparatus.

The method of FIG. 3A provides a volume-coverage range characterization for the apparatus. The method begins at block 305 wherein object property data is obtained. This object property data is indicative of a range of desired object property values for a three dimensional object to be produced. For example, it may comprise a value, or range of values, for one or more of a desired object rigidity and flexibility.

The following blocks 310 to 330 may be applied for each vector component of a material volume coverage vector, e.g. each material primary or combination available to the apparatus. At block 310, ramp data indicative of increasing volume coverage values for a given vector component is obtained. This ramp data may be computed from an initial predefined minimum volume coverage value and an initial predefined maximum volume coverage value. For example, if an initial predefined minimum volume coverage value is 15% (e.g. 15% of a unit volume of a resultant object comprises the material(s) of the vector component) and an initial predefined maximum volume coverage value is 65% (e.g. 65% of a unit volume of a resultant object comprises the material(s) of the vector component) then the ramp data may be computed using a step function with steps of 5% increasing volume coverage. In other cases a continuous transition may be computed. At block 315 halftoning is applied to the ramp data to generate control data for the generation of a three dimensional test object having at least one dimension representative of the increasing volume coverage values. For example, if the ramp data is defined for one or more z-slices of a three-dimensional object then a threshold matrix may be applied to each z-slice as part of the halftoning operation. The halftoning operation results in discrete output state data that may be used to control discrete deposits of materials and their combinations, e.g. drops of one or more materials if an apparatus uses an inkjet mechanism to deposit liquid or molten material. The one or more z-slices comprising the ramp data that are halftoned in this manner may be termed "plaques". In one case, a three-dimensional threshold matrix may be used to perform a halftoning operation in three-dimensions in one operation.

At block 320, a three dimensional test object, e.g. the "plaque" described above, is produced using the apparatus according to the control data output from block 315. At block 325, measurement data for one or more object properties over the at least one dimension of said three dimensional test object is obtained. For example, a mechanical measurement apparatus may be used to measure the rigidity and/or flexibility of the "plaque". Multiple measurements may be made across the length of the dimension of the produced test object that exhibits the varying volume coverage. For example, a measurement may be made for each "step" described above.

Following block 325, the obtained measurement data is processed, together with the ramp data, to generate configuration data 350 indicative of a range of volume coverage values for the given vector component that exhibit the range of desired object property values obtained at block 305. For example, a desired minimum stiffness value may be obtained at block 305. The measurement data obtained at block 325 may then be analyzed to determine locations along the at least one dimension that meet this minimum stiffness value. These locations may then be mapped to volume coverage values in the ramp data so as to determine minimum and/or maximum volume coverage values that meet the desired minimum stiffness value. In one case, a tolerance range may be set together with the desired object property values. In one case, minimum and maximum volume coverage values are determined that meet a plurality of object property criteria, e.g. that meet flexibility and rigidity criteria. In another case, minimum and maximum volume coverage values may be determined for each individual desired object property. In this case these volume coverage values may be used separately and/or combined to generate average values for use. In any case, a volume coverage range is defined as part of the configuration data for use in characterizing the apparatus.

The method of FIG. 3B provides a material usage or quantity range characterization for the apparatus. The method is similar to that of FIG. 3A. The method of FIG. 3B may be used independently of, or following, the method of FIG. 3A. Similar to block 305 of FIG. 3A, the method of FIG. 3B begins at block 355 wherein object property data is obtained. If the method of FIG. 3B follows that of FIG. 3A, then this block may be omitted and the data from block 305 may be used. As before, it may comprise a value, or range of values, for one or more of a desired object rigidity and flexibility.

The following blocks 360 to 375 may be applied for each material primary available to the apparatus, e.g. each vector component. If the method of FIG. 3B follows that of FIG. 3A, block 360 to 375 may also be applied within the range of volume coverage values resulting from the method of FIG. 3A.

At block 360, control data is generated for the apparatus that is indicative of a range of material volume coverage vector values. This may comprise computing ramp data representative of increasing material use from single materials to multiple combined or over-deposited materials.

Figure 7:
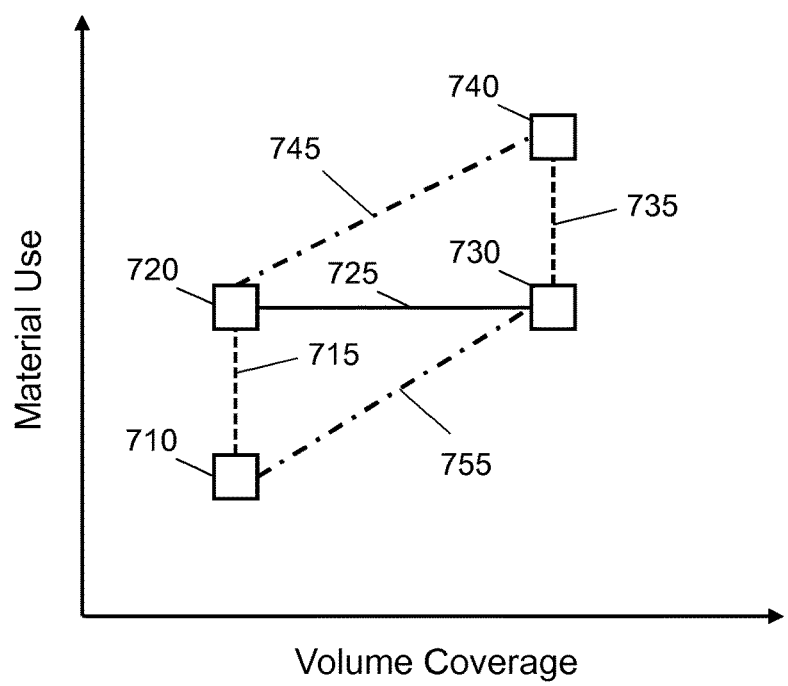
FIG. 7 is a chart showing a basis for ramp data according to an example.

An example basis for this ramp data is shown in FIG. 7. FIG. 7 shows points 710, 720, 730 and 740 that each represent a different material volume coverage vector. In this example, there are four material combinations that are available. These combinations are based on a Magenta build material ("M"), a Yellow build material ("Y") and an absence of build material (i.e. blank "B"). For example, the available material combinations, i.e. the components of the material volume coverage vector are: [M, Y, MY, and B]. Point 710 represents a material volume coverage vector with a value of [M=0.125, Y=0.125, MY=0, B=0.75]; point 720 represents a material volume coverage vector with a value of [M=0, Y=0, MY=0.25, B=0.75]; point 730 represents a material volume coverage vector with a value of [M=0.25, Y=0.25, MY=0, B=0.5]; and point 740 represents a material volume coverage vector with a value of [M=0, Y=0, MY=0.5, B=0.5]. Material use is plotted on the y-axis and volume coverage is plotted on the x-axis. Ramp data may then be generated between these points to compare the case of using M and Y independently with the case of using the MY combination. For example, varying between points 710 and 720 on path 715 or between points 730 and 740 on path 735 keeps a constant volume coverage but varies material use (from MY at 25% to M at 12.5% and Y at 12.5% or from MY at 50% to M at 25% and Y at 25%). Varying between points 720 and 730 keeps material use constant but varies volume coverage (from MY at 25% to M at 25% and Y at 25%). Lastly, varying between points 720 and 740 or 710 and 730 varies both material use and volume coverage for the individual materials used (from M at 12.5% and Y at 12.5% to M at 25% and Y at 25%) or their combination (from MY at 25% to MY at 50%). Ramp data based on paths 715 and 745, as an example, may be manifest in test objects or plaques as a discrete transition from 25% MY (75% blank) to 50% MY (50% blank) in 16 steps (2×8 patches) on the top of the object (path 745) or a discrete transition from 25% MY (75% blank) to 12.5% M and 12.5% Y (75% blank) in 16 steps (2×8 patches) on the top of the object (path 715).

This ramp data may comprise a series of distinct patches. Block 360 may comprise halftoning the ramp data, as described previously, to generate the control data. At block 365, at least one three-dimensional test-object is produced, using the apparatus, based on said control data. In this example, the at least one three-dimensional test-object has at least one dimension representative of the range of material volume coverage vector values.

Blocks 370 and 375 of the method of FIG. 3B are similar to blocks 325 and 330 of FIG. 3A. At block 370, measurement data is obtained for one or more object properties over the at least one dimension of said three dimensional test object and at block 375 configuration data 350 is generated indicative of a range of material volume coverage vector values that exhibit the range of desired object property values. The output of the method of FIG. 3B comprises minimum and/or maximum material usage values that exhibit the desired object property values.

FIG. 4 schematically illustrates a test object that may be used to combine the methods of FIGS. 3A and 3B as one process. In this case one or more test objects are produced based on a matrix of varying volume coverage and varying usage values for one or more vector components of a material volume coverage vector, wherein said values vary over the two-dimensions of the matrix. The matrix may be halftoned to generate control data indicative of said matrix as described above. At least one three-dimensional test-object is produced based on said control data, wherein the at least one three-dimensional test object has two-dimensions representative of the two-dimensions of the matrix. This is shown in the test object 400 of FIG. 4. In this case, volume coverage varies with the x dimension 410 and material quantity or usage varies with the y dimension 420. In this case, measurement data for one or more object properties over the at least two dimensions of said three dimensional test object is obtained and configuration data is generated based on the matrix and said measurement data. The configuration data in this instance is indicative of respective ranges of volume coverage and material quantity or usage values that exhibit the range of desired object property values.

Figure 5:
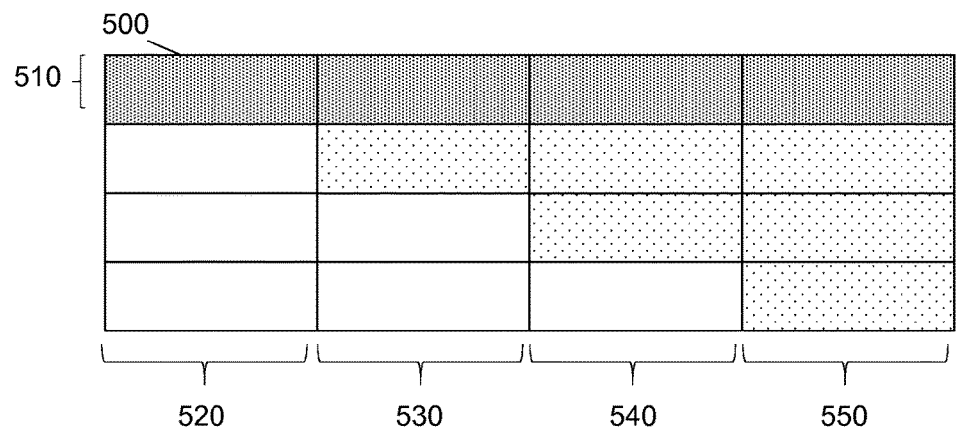
FIG. 5 is a schematic illustration of a three-dimensional test object for determining thickness according to an example.

FIG. 5 shows a schematic configuration for at least a test object portion 500 that may be used to characterize underprints, e.g. how a surface of a test object appears when certain material components are deposited as one or more layers under the surface. FIG. 5 shows a side view, e.g. a cross section, of the test object portion 500 (e.g. with an z-axis in the vertical direction and one of the x or y axes in the horizontal direction).

In FIG. 5, the test object portion 500 has a surface layer 510. This may be a given slice of the three dimensional object, such as a given one-voxel high z-plane. This is formed from materials representative of one of the vector components of a material volume coverage vector. In a first column 520, there are three layers of a second material primary that is different from that used for the surface layer 510. In a second column 530, there are two consecutive layers of the surface layer material primary and two layers of the second material primary. In a third column 540, there are three consecutive layers of the surface layer material primary and one layer of the second material primary. Finally, in a fourth column there are four consecutive layers of the surface layer material primary.

The test object portion 510 of FIG. 5 is generated by obtaining thickness range data indicative of a range of thicknesses for a given vector component, i.e. material primary. For example, in FIG. 5, the surface layer has of range of thickness: from one voxel in column 520 to four voxels in column 550. A thickness may be measured in standard length measurement units, e.g. millimeters or centimeters, and/or as a number of layers or z-planes. The example of FIG. 5 measures thickness as a number of layers wherein each layer is one voxel deep; in other examples, layers may have a depth of a different number of voxels. The thickness range data is then used to generate control data, e.g. by halftoning the thickness range data. The test object portion 510 is then produced with at least one dimension representative of the range of thicknesses, e.g. in FIG. 5 this is the x/y or horizontal dimension.

The test object portion shown in FIG. 5 may be used to determine a number of layers are needed for a desired color to be sufficiently opaque without being affected by its underlying layers. In a similar manner to block 130, measurement data may be obtained that is indicative of values for at least one color property measured across the at least one dimension with varying underlying thicknesses. The measurement data may be obtained, as discussed previously, by measuring the surface of the test object with a spectrophotometer or colorimeter. This measurement data may then be processed, together with the thickness range data, to generate configuration data indicative of a thickness that exhibits a desired color property value. For example, a measured color property may vary across the x/y dimension (e.g. across the surface of test object portion 510). A minimum thickness may be selected, e.g. a minimum thickness of the surface material primary, when a derivative of the color property is below a given threshold, e.g. beyond a certain number of replicated backing layers the color properties will no longer significantly change. For example, there may be a small measured color difference between columns 540 and 550 but a large measured color difference between columns 540 and 530; in this case a minimum thickness may be configured as three layers, e.g. three voxels in the z-direction.

Figure 8:
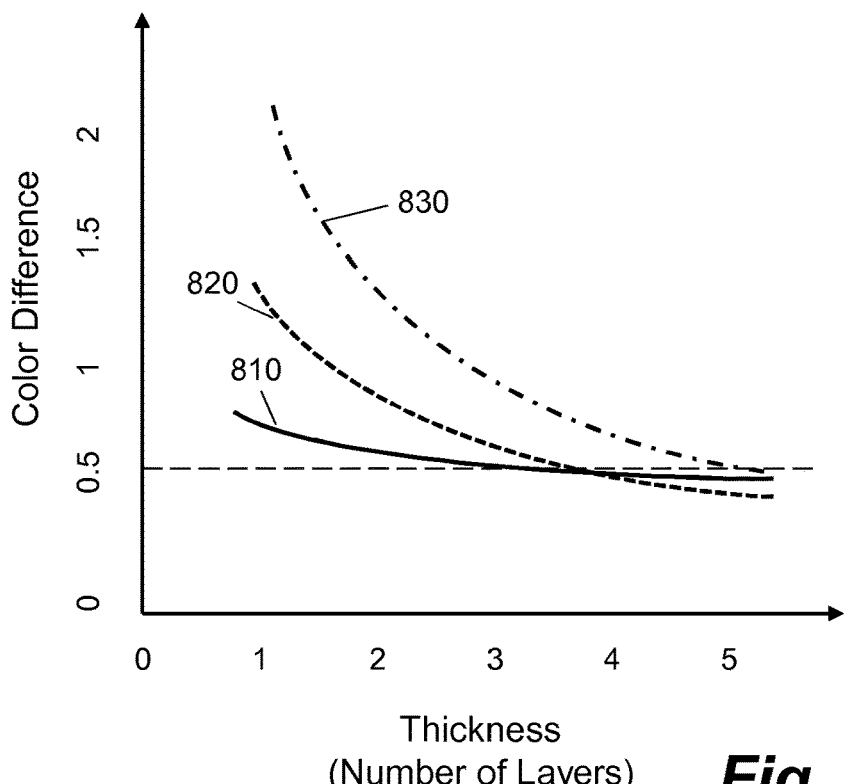
FIG. 8 is a chart showing how color difference varies with thickness according to an example.

FIG. 8 shows an example chart for three colored build materials, (i.e. for three material primaries): a black build material 810; a green build material 820; and a yellow build material 830. The chart shows how a color difference (in this case the CIE dE2000 standard measured for a constant surface material volume coverage vector) on the y-axis of the chart varies with a thickness measured by a number of z-layers (e.g. each layer of 1-voxel depth) on the x-axis of the chart. If a color difference of 0.5 or below is chosen as a configurable threshold, then the chart shows that a thickness of approximately 3 layers of black build material, 4 layers of green build material and 5 layers of black build material meet this threshold.

In certain cases, the second material primary may comprise a filler material or material combination that is configured to fill interior portions of a three-dimensional object. Test object portions such as 510 may be generated and measured for each material primary. In certain cases test object portions such as 510 may also be generated and measured for the minimum and maximum volume coverage values output as configuration data from the method of FIG. 3A, e.g. each vector component/material primary may have two respective test portions.

In one example, the volume coverage characterization, the material usage or quantity characterization and the underprint characterization may be performed in that order prior to the color and material characterization method of FIG. 1. In this case, the coverage data obtained at block 110 of method 100 of FIG. 1 may comprise material volume coverage vectors that have values within the ranges output by the methods of FIGS. 3A and/or 3B. The three dimensional test object portions produced at block 120 of FIG. 1 may also be configured to have a thickness greater than a minimum thickness as output when processing the test object portions shown in FIG. 5. As described with reference to FIG. 4, in certain cases test object portions from each of the different characterizations may be combined on one or more test objects; for example, a test object may have portions for each of one or more of the characterizations.

In one example, the configuration data generated from any of the examples described above is used to calibrate the apparatus to produce a three-dimensional object. Production of such a three-dimensional object may comprise: obtaining object data representing the three-dimensional object to be generated, the object data comprising data indicative of one or more color property values for the object; mapping the one or more color property values for the object to one or more respective material volume coverage vector values based on the configuration data; halftoning the one or more respective material volume coverage vector values to generate control data for the production of the three-dimensional object; and producing the three-dimensional object using the apparatus based on the control data.

In certain cases, the configuration data provides a mapping from colorimetric data associated with an object to be produced (e.g. XYZ or LAB data, or in other cases RGB data) to material volume coverage vector values. If angular information is measured, e.g. as described with reference to FIG. 2, then the mapping may be provided for a set of angles. Interpolation may be used between measured angles and/or between node mappings generated in block 140 of FIG. 1. In certain cases, a continuous tone, vector three dimensional object defined in object data may be processed by computing a surface normal for one or more surfaces and interpolating the angle among the available colorimetry-to-coverage-vector mappings. In this case, a relation between angle, color and a material volume coverage is determined for a specific apparatus and is encoded as the configuration data for use by the apparatus.

Figure 6:
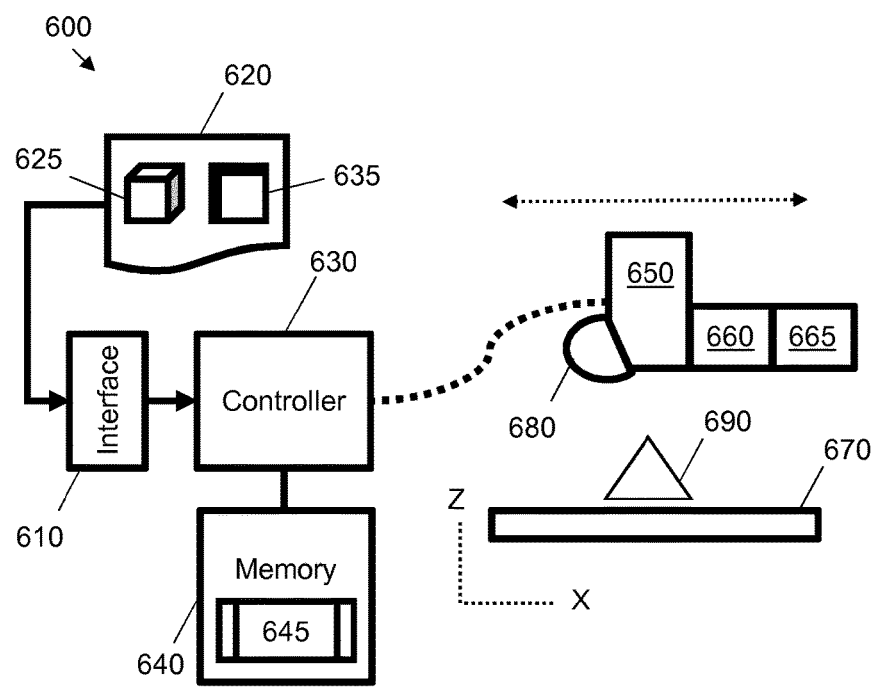
FIG. 6 is a schematic illustration of an apparatus arranged to produce a three-dimensional object according to an example.

FIG. 6 shows an example of an apparatus 600 arranged to produce a three-dimensional object 690. The apparatus 600 comprises a data interface 610 arranged to receive object data 620 for the three-dimensional object; a controller 630 communicative coupled to the data interface 610; and a memory 640 arranged to store configuration data 645. In the present example, the object data 620 comprises model data 625, e.g. a vector representation of a three dimensional object, and property data 635, the property data 635 setting out color and/or object property data for the three-dimensional object. In certain cases, the model data 625 and the property data 635 may be combined. The configuration data 645 provides a mapping from object data 620 to control data for production of the three-dimensional object.

In FIG. 6, the controller 630 is also communicatively coupled to aspects of the apparatus that are arranged to construct the three dimensional object. These comprise a build mechanism 650 and a supply mechanism 660, 665. In the schematic example of FIG. 6, the supply mechanism 660, 665 comprise two components: a first component 660 for the supply of a first material (e.g. build material M1 as discussed above) and a second component 665 for the supply of a second material (e.g. build material M2 as discussed above). Two materials are shown in this example for ease of explanation but any number of materials may be supplied. The build mechanism 650 is arranged to deposit a combination of one or more materials (these combinations being material primaries or vector components) to produce the three-dimensional object 690. In the example of FIG. 6, the three-dimensional object 690 is built layer by layer on a platen 670. The arrangement of the aspects and components shown in FIG. 6 are not limiting; the exact arrangement of each apparatus will vary according to the production technology that is implemented and the model of apparatus.

In the example of FIG. 6 the controller is arranged to apply the configuration data 645 to the object data 620 received by the data interface 610 to generate control data for production of the three-dimensional object 690 using the build mechanism 650. In the example of FIG. 6, the apparatus also comprises a measurement device 680 arranged to measure at least a color of the produced three-dimensional object 690. In other examples, the measurement device 680 may be independent of the apparatus 600. In operation the controller 630 is configured to implement a characterization routine. The controller 630 is thus configured to: instruct the production of a set of three-dimensional test object portions, each portion being instructed based on control data comprising a set of respective material volume coverage vectors; receive measurement data from the measurement device 680 for said three-dimensional test object portions; and based on the received measurement data, update the configuration data in the memory. The characterization routine may thus comprise a calibration routine to be implemented by an end-user.

The measurement device 680 may comprise one or more of: a spectrophotometer, a colorimeter; a goniospectrophotometer; and a telespectroradiometer. In one case, the controller 630 is configured to determine angle data and color data from the object data and to apply the configuration data to said angle data and color data to generate the control data. In this case, each three-dimensional test object portion may comprise at least one polyhedron that quantizes a hemisphere, each polyhedron having faces with predefined angles and the measurement device is arranged to measure angular spectral reflectance from said polyhedral. In one case, the controller 630 is configured to instruct the production of a set of three-dimensional test object portions comprising: volume coverage characterization portions based on a range of volume coverage values; material usage characterization portions based on a range of material usage values; and underprint characterization portions based on a range of thicknesses. The controller 630 may also be configured to: map colorimetry data derived from the object data 620 to a set of material volume coverage vectors using the configuration data 645; and halftone the set of material volume coverage vector to generate discrete deposit instructions for the build mechanism 650.

Certain examples described herein enable the characterization and/or calibration of an apparatus arranged to produce three-dimensional objects, e.g. so-called "3D printers". Configuration data is generated that may represent a volume of colors or gamut that is available for reproduction by the apparatus given a set of available materials. In certain examples, the configuration data further relates this volume to suitable volume coverage and material component use ranges, e.g. enables a volume to be configured that also results in desired material properties of a produced three-dimensional object.

Certain examples described herein provide configuration data that forms a set of material separation resources. In certain cases these comprise a series of mappings for different angles from colorimetric values to material volume coverage vectors. This enables a controller of the apparatus to process arbitrary image content while respecting colorimetry. The configuration data further provides a color calibration that allows for linear transitions in color/material space. Certain examples described herein may be are material agnostic. This enables the examples to be used to configure arbitrary apparatus with multiple materials, e.g. multiple inks and build materials.

In certain cases the configuration data may comprise an RGB to MVoc look-up table. This operates in a device RGB domain. An object model may then be described in a standard RGB space such as sRGB. An International Color Consortium (ICC) profile may then be constructed to convert colorimetry to RGB and vice versa. This can then be used to convert to CIE LAB or XYZ data, which can then be mapped to the device RGB values. The object can then be mapped to MVocs using the configuration data, allowing an object to be generated that respects an initially defined colorimetry.

Certain methods described herein may be implemented by one or more processors that processes computer program code that is retrieved from a non-transitory storage medium. For example, the method of FIG. 1 may be implemented by one or more processors forming part of controller 630 in FIG. 6 or one or more processors of a computer device coupled to an apparatus arranged to produce three-dimensional objects. In certain cases the one or more processors may form part an embedded computing device, e.g. adapted for use in controlling an additive manufacturing system. The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for generating configuration data for an apparatus, the apparatus being arranged to produce a three-dimensional object with a set of materials, the method comprising:

obtaining coverage data indicative of a range of material volume coverage vector values for the set of materials, a material volume coverage vector representing proportions for each producible combination of the set of materials for at least an addressable volume of a three-dimensional object to be produced;

producing, using the apparatus, a set of three-dimensional test object portions, different portions having a different material volume coverage vector value from said range;

obtaining measurement data indicative of at least one color property for each portion; and generating, based on the coverage data and the measurement data, configuration data for the apparatus that maps at least values of the at least one color property to material volume coverage vector values, wherein for at least one given material primary that is representative of a vector component of the material volume coverage vector, the method further comprising:

obtaining thickness range data indicative of a range of thicknesses for the given material primary;

generating control data indicative of the thickness range data;

producing, using the apparatus, at least one three-dimensional test-object based on said control data, the at least one three-dimensional test-object having at least one dimension representative of the range of thicknesses;

obtaining measurement data indicative of values for at least one color property measured across the at least one dimension; and generating, based on the thickness range data and the measurement data, configuration data indicative of a thickness that exhibits a desired color property value.

2. The method of claim 1, wherein each three-dimensional test-object portion comprises a plurality of angled exterior surfaces, comprising:

obtaining measurement data indicative of at least one color property of each portion comprises obtaining a plurality of measured values for the at least one color property at a plurality of different angles, and generating configuration data comprises generating configuration data that maps values of the at least one color property and a plurality of angle values for a surface of a three-dimensional object to be produced to material volume coverage vector values.

3. The method of claim 2, wherein obtaining measurement data comprises using one or more of:

a goniospectrophotometer; and a sampling of a fixed set of angles using at least one of:

a telespectroradiometer;

a spectrophotometer; and a colorimeter.

4. The method of claim 1, comprising:

obtaining object property data indicative of a range of desired object property values for a three dimensional object to be produced; and for one or more material primaries represented as respective vector components in a material volume coverage vector:

obtaining ramp data indicative of increasing volume coverage values for a given material primary;

applying halftoning to the ramp data to generate control data for the generation of a three dimensional test object having at least one dimension representative of the increasing volume coverage values;

producing, using the apparatus, said three-dimensional test-object;

obtaining measurement data for one or more object properties over the at least one dimension of said three dimensional test object; and generating, based on the object property data and said measurement data, configuration data indicative of a range of volume coverage values for the given material primary that exhibit the range of desired object property values.

5. The method of claim 1, comprising:

obtaining object property data indicative of a range of desired object property values for a three dimensional object to be produced;

generating control data indicative of a range of material usage;

producing, using the apparatus, at least one three-dimensional test-object based on said control data, the at least one three-dimensional test-object having at least one dimension representative of the range of material usage;

obtaining measurement data for one or more object properties over the at least one dimension of said three dimensional test object; and generating, based on the object property data and said measurement data, configuration data indicative of a range of material volume coverage vector values that exhibit the range of desired object property values.

6. The method of claim 1, comprising:

obtaining object property data indicative of a range of desired object property values for a three dimensional object to be produced;

obtaining a matrix of varying volume coverage and material usage values, said values varying over the two-dimensions of the matrix;

generating control data indicative of said matrix;

producing, using the apparatus, at least one three-dimensional test object based on said control data, the at least one three-dimensional test object having two dimensions representative of the two-dimensions of the matrix;

obtaining measurement data for one or more object properties over the at least two dimensions of said three dimensional test object; and generating, based on the matrix and said measurement data, configuration data indicative of respective ranges of volume coverage and material usage values that exhibit the range of desired object property values.

7. The method of claim 1, comprising:

obtaining object data representing a three-dimensional object to be generated, said object data comprising data indicative of one or more color property values for the object;

mapping the one or more color property values for the object to one or more respective material volume coverage vector values based on the configuration data;

halftoning the one or more respective material volume coverage vector values to generate control data for the production of the three-dimensional object; and producing the three-dimensional object using the apparatus based on the control data.

8. An apparatus arranged to produce a three-dimensional object comprising:

a supply mechanism to supply a set of materials;

a build mechanism to combine one or more of the set of materials to produce the three-dimensional object;

a data interface arranged to receive object data for the three-dimensional object;

a memory arranged to store configuration data, the configuration data providing a mapping from object data to control data for production of the three-dimensional object;

a controller arranged to apply the configuration data to the object data received by the data interface to generate control data for production of the three-dimensional object using the build mechanism; and a measurement device arranged to measure a property of the produced three-dimensional object, wherein the controller is configured to:

instruct the production of a set of three-dimensional test object portions, each portion being instructed based on control data comprising a set of respective material volume coverage vectors;

receive measurement data from the measurement device for said three-dimensional test object portions; and based on the received measurement data, update the configuration data in the memory, wherein the set of three-dimensional test object portions comprise:

volume coverage characterization portions based on a range of volume coverage values for one or more material primaries representative of respective vector components of the material volume coverage vector;

material usage characterization portions based on a range of material usage for one or more material primaries; and underprint characterization portions based on a range of thicknesses of one or more material primaries.

9. The apparatus of claim 8, wherein the measurement device comprises one or more of:

a goniospectrophotometer; and a color measurement device arranged to measure a color property at a plurality of angles.

10. The apparatus of claim 9, wherein the controller is configured to determine angle data and color data from the object data and to apply the configuration data to said angle data and color data to generate the control data.

11. The apparatus of claim 8, wherein the controller is configured to:

map colorimetry data derived from the object data to a set of material volume coverage vectors using the configuration data; and halftone the set of material volume coverage vectors to generate discrete deposit instructions for the build mechanism.

12. The apparatus of claim 8, wherein each three-dimensional test object portion comprises at least one polyhedron that quantizes a hemisphere, each polyhedron having faces with predefined angles and the measurement device is arranged to measure one or more of angular spectral reflectance and colorimetry from said polyhedral.

13. A method for generating configuration data for an apparatus, the apparatus being arranged to produce a three-dimensional object with a set of k available materials and having L discrete deposit states for said materials, the method comprising:

producing, using the apparatus, a set of three-dimensional test object portions, the set of test objects portions comprising:

an volume-coverage characterization portion corresponding to at least one vector component of a material volume coverage vector, the material volume coverage vector having $L^k$ vector components representing each material and deposit state combination, and a material usage characterization portion corresponding to at least one vector component of the material volume coverage vector;

obtaining measurement data for one or more object properties for each volume-coverage and material usage characterization portion;

determining, based on said measurement data, a range of volume coverage values and a range of material usage values that exhibit one or more desired object properties;

producing, using the apparatus, a set of three-dimensional test object portions, the set of test objects portions comprising:

an underprint characterization portion corresponding to at least one vector component of the material volume coverage vector;

obtaining measurement data for a color property for each underprint characterization portion;

determining, based on said measurement data, a thickness that exhibits a desired metric based on the color property;

determining a set of material volume coverage vectors values conforming to the determined range of volume coverage values, the determined range of material usage values and the determined thickness;

producing, using the apparatus, a set of three-dimensional test object portions, the set of test objects portions comprising:

a color characterization portion for each of the set of material volume coverage vector values;

obtaining measurement data indicative of a color property for each color characterization portion; and generating, based on the set of material volume coverage vectors and the measurement data, configuration data for the apparatus that maps the at least one color property value to material volume coverage vector value.

* * * * *